(12) United States Patent
Wu et al.

(10) Patent No.: US 10,838,119 B2
(45) Date of Patent: Nov. 17, 2020

(54) RETROREFLECTIVE STRUCTURAL COLOUR FILM FOR SMART DISPLAYS AND THE PREPARATION METHOD THEREOF

(71) Applicant: FUDAN UNIVERSITY, Shanghai (CN)

(72) Inventors: Li-Min Wu, Shanghai (CN); Jing Zeng, Shanghai (CN); Wen Fan, Shanghai (CN); Qiao-Qiang Gan, East Amherst, NY (US); Deng-Xin Ji, Shanghai (CN); Hao-Min Song, Shanghai (CN)

(73) Assignee: Fudan University, Shanghai (CN)

( * ) Notice: Subject to any disclaimer, the term of this patent is extended or adjusted under 35 U.S.C. 154(b) by 219 days.

(21) Appl. No.: 16/175,787

(22) Filed: Oct. 30, 2018

(65) Prior Publication Data
US 2019/0162882 A1    May 30, 2019

(30) Foreign Application Priority Data
Nov. 27, 2017 (CN) .......................... 2017 1 1202613

(51) Int. Cl.
*G02B 5/128* (2006.01)
*G09F 13/16* (2006.01)
(Continued)

(52) U.S. Cl.
CPC .............. *G02B 5/128* (2013.01); *E01F 9/524* (2016.02); *E01F 9/608* (2016.02); *E01F 9/619* (2016.02); *F21S 41/30* (2018.01); *G09F 13/16* (2013.01)

(58) Field of Classification Search
None
See application file for complete search history.

(56) References Cited

U.S. PATENT DOCUMENTS

| 4,758,469 A * | 7/1988 | Lange ..................... C04B 14/30 428/325 |
| 5,378,520 A * | 1/1995 | Nagaoka ................ G02B 5/128 156/276 |

(Continued)

FOREIGN PATENT DOCUMENTS

CN    201711202613.3 A1    4/2018

OTHER PUBLICATIONS

Lee W. Young, PCT/US 16/17984 International search report, MB-1PCT, dated Jun. 28, 2016, ISA/US.

*Primary Examiner* — Jennifer D. Carruth
(74) *Attorney, Agent, or Firm* — OPES IP Consulting Co. Ltd.

(57) ABSTRACT

The present disclosure relates to an retroreflective structural colour film and a preparation method thereof. The main steps are as follows: (1) assembling colloidal microspheres to form a monolayer of microspheres; and (2) transferring the monolayer of microspheres onto a transparent substrate which has an adhesive layer to make the monolayer of microspheres partially embedded in the adhesive layer to prepare the retroreflective structural colour film. The retroreflective material has the advantages of the simple preparation process, high reflective brightness and uniformity of reflection colour. Moreover, the retroreflective material can exhibit unique retroreflective structural colour under the illumination of a white light source. These characteristics make the retroreflective material especially suitable for nighttime traffic safety applications, for example, to provide a constant colour signal to drivers, and simultaneously to provide dynamically changing colour signal to pedestrians to warn them of approaching vehicles.

7 Claims, 6 Drawing Sheets

(51) Int. Cl.
    *E01F 9/524*     (2016.01)
    *F21S 41/30*     (2018.01)
    *E01F 9/608*     (2016.01)
    *E01F 9/619*     (2016.01)

(56) References Cited

U.S. PATENT DOCUMENTS

| | | | | |
|---|---|---|---|---|
| 5,928,761 | A | * | 7/1999 | Hedblom ................ E01F 9/524 428/143 |
| 2003/0170442 | A1 | * | 9/2003 | Kaminsky ............ G02B 5/0221 428/315.5 |
| 2019/0162882 | A1 | * | 5/2019 | Wu ........................ E01F 9/608 |

* cited by examiner

RETROREFLECTIVE STRUCTURAL COLOUR FILM FOR SMART DISPLAYS AND THE PREPARATION METHOD THEREOF

CROSS-REFERENCE TO RELATED APPLICATIONS

The present application claims priority to Patent Application No. 201711202613.3 filed in China on Nov. 27, 2017, the entire contents of which are hereby incorporated by reference into this application.

BACKGROUND OF THE INVENTION

1. Field of the Invention

The present invention belongs optical functional material field, relates to retroreflective structural colour film for smart displays and the preparation method thereof, and especially relates the preparation of transferring a monolayer of colloidal microspheres to a transparent substrate with an adhesive layer to make the microspheres partially embedded into the adhesive layer of the substrate so as to prepare retroreflective structural colour film.

2. Description of the Related Art

Retroreflective material can efficiently reflect incident light back toward the light source, and is widely used to provide traffic visibility at nighttime by reflecting vehicle's own headlights back to the driver. Retroreflective materials are widely used in fields such as reflective traffic signs, clothes and delineators. Currently, retroreflective materials are mainly classified into glass bead type and microprism type. Glass bead type retroreflective materials mainly rely on the retroreflection effect of high refractive index glass beads. The principle of the microprism type retroreflective materials is to utilize the multiple reflection effect of the mirror surface of the microprism. However, the reflection colour of the above commercially available retroreflective materials is generally one single colour, such as white colour or the colour caused by additional pigments.

The structural colour, also known as the physical colour, is the colour produced by micro- or nano-structures. The typical mechanisms of structural colour include film interference, diffraction grating, scattering and photonic crystal effect. Structural colours are widely found in nature, such as bird feathers, butterfly wings and beetle skins. The structural colour has the advantages of high saturation, no fading with time, environment friendly and iridescent effect. The generation mechanism and artificial preparation of structural colour have attracted considerable interest from both industry and academia, and structural colours have important applications in the fields of signal transmission, sensing, imaging display and so on. At present, research on structural colour is mainly focused on photonic crystals. Photonic crystals are mainly two-dimensional or three-dimensional periodic structures assembled with submicron-sized colloidal nanospheres, wherein different colours can be obtained by adjusting parameters such as particle diameter and refractive index of the colloidal nanospheres and the colour would change with viewing angle. However, the structural colour of the photonic crystals has the disadvantages of limited view angle, low reflective brightness and limited view distance. Other structural colours that mimic the microstructure of natural organisms generally require complex manual design and high cost, making them unsuitable for large-scale applications.

SUMMARY OF THE INVENTION

The present invention provides a novel method for preparing retroreflective structural colour film. The retroreflective material has the advantages of high reflective brightness and uniformity of reflection colour, and perform two special reflective characteristics, namely, non-iridescent colour (with colours that are independent of the illumination or viewing angle) under parallel illumination and viewing condition, and iridescent colour (with colours that depend on the illumination or viewing angle) under non-parallel illumination and viewing condition, making the retroreflective material valuable in theoretical research and practical application.

The invention provides a preparation method of retroreflective structural colour film, characterized in that the specific steps are: (1) assemble colloidal microspheres to form a monolayer of microspheres on the surface of a substrate material by a self-assembly method; the material of the colloidal microspheres can be any one or any combination of the following organic or inorganic components: polystyrene, polymethyl methacrylate, polyacrylic acid, polyvehiclebonate, polyurethane, epoxy resin, silica, titanium dioxide, borosilicate, barium titanate and aluminum oxide; (2) transfer the monolayer of microspheres prepared in step (1) onto a transparent substrate which has an adhesive layer to make the monolayer of microspheres immersed in the adhesive layer to prepare the retroreflective structural colour film.

Furthermore, in the present invention the particle diameter of the colloidal microspheres can be in the range of 1 µm to 1000 µm.

Furthermore, in the present invention the colloidal microspheres can be the microspheres with a uniform particle diameter or a mixture of microspheres with two or more particle diameters.

Furthermore, in the present invention the method for assembling the colloidal microspheres to form the monolayer of microspheres can be any one of rubbing assembly method, liquid volatilization assembly method, interface assembly method, template assembly method, mechanical spraying method and spin coating method.

Furthermore, in the present invention the transparent substrate which has an adhesive layer can be a scotch tape or a transparent substrate coated with an adhesive or a viscous layer.

Furthermore, in the present invention the monolayer of microspheres immersed in the adhesive layer means that the monolayer of microspheres can be partially embedded into the adhesive layer.

The invention also provides retroreflective structural colour film, comprising: a transparent substrate, which has an adhesive layer; and a monolayer microsphere array assembled on the surface of the adhesive layer of the transparent substrate, wherein the monolayer of microspheres can be made of colloidal microspheres, the material of the colloidal microspheres can be any one or any combination of the following organic or inorganic components: polystyrene, polymethyl methacrylate, polyacrylic acid, polyvehiclebonate, polyurethane, epoxy resin, silica, titanium dioxide, borosilicate, barium titanate and aluminum oxide.

The beneficial effects of the retroreflective structural colour film prepared in the present invention are:

(1) The retroreflective structural colour film is easy, fast and inexpensive to prepare, and suitable for large-scale preparation.

(2) Since the microspheres are tightly arranged and each microsphere can act as a reflection point, the retroreflective material has high reflection intensity.

(3) The retroreflective structural colour film can exhibit bright and saturated colour appearance. Moreover, it has two special reflective characteristics: one is non-iridescent colour under parallel illumination and viewing condition, and the other is iridescent colour under non-parallel illumination and viewing condition.

(4) By changing the parameters such as the microsphere diameter and refractive index of the microspheres, the reflection effects with different colours can be obtained.

(5) Commercially available retroreflective material can only provide traffic information to drivers. While the retroreflective structural colour film can provide different traffic information to both drivers and pedestrians. For example, when used as a traffic sign, the retroreflective structural colour film can reflect constant colour signal to drivers (under parallel illumination and viewing condition), and simultaneously reflect dynamically changing colour signal to pedestrians (under non-parallel illumination and viewing condition) when a vehicle is approaching the pedestrians from behind. Thus, the retroreflective structural colour film has great practical value for reducing the collision probability between pedestrians and vehicles. Moreover, the retroreflective structural colour film can be implemented in current nighttime traffic signs/signals/advertisements to enable unique smart display functionalities.

DETAILED DESCRIPTION OF THE INVENTION

The invention will now be further described with the reference of the drawings and embodiment. And "colloidal microsphere" is simply referred to as "microsphere" in the following description.

Embodiment

Firstly, centrifuge the PS (i.e., polystyrene) microsphere aqueous dispersion with a particle diameter of 15 μm to remove the supernatant, and then precipitate the microspheres and dry at room temperature.

Prepare the monolayer of microspheres by rubbing assembly method: place the dried PS microsphere powder into the middle area of a polydimethylsiloxane (PDMS) film, and grind the PS microsphere powder in one direction with a PDMS block, thus a monolayer of closely packed PS microspheres can be formed on the PDMS film. And then transfer the monolayer onto the sticky side of a scotch tape, a retroreflective film (hereinafter referred to as PS retroreflective film) made of 15 μm PS microspheres is obtained.

Figure 1:
FIG. 1 is a photograph of the prepared PS retroreflective film under the illumination of a white LED flashlight.

FIG. 1 is a photograph of the prepared PS retroreflective film under the illumination of a white LED flashlight. The film surface without the microspheres reflects a uniform and bright green colour, while the film surface with the microspheres is non-reflective and colourless.

Figure 2:
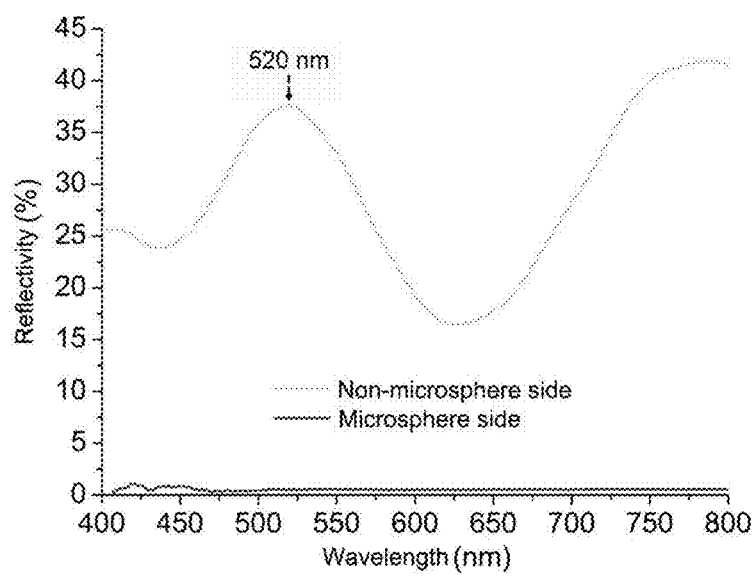
FIG. 2 is a reflectance spectrum measured from the tape side or microsphere side of the PS retroreflective film.

FIG. 2 is the reflectance spectra measured from the tape side or microsphere side of the PS retroreflective film. It can be seen that the film surface without microspheres has a strong reflection peak at 520 nm, and the film surface with microspheres is hardly reflective in the visible region.

Figure 3:
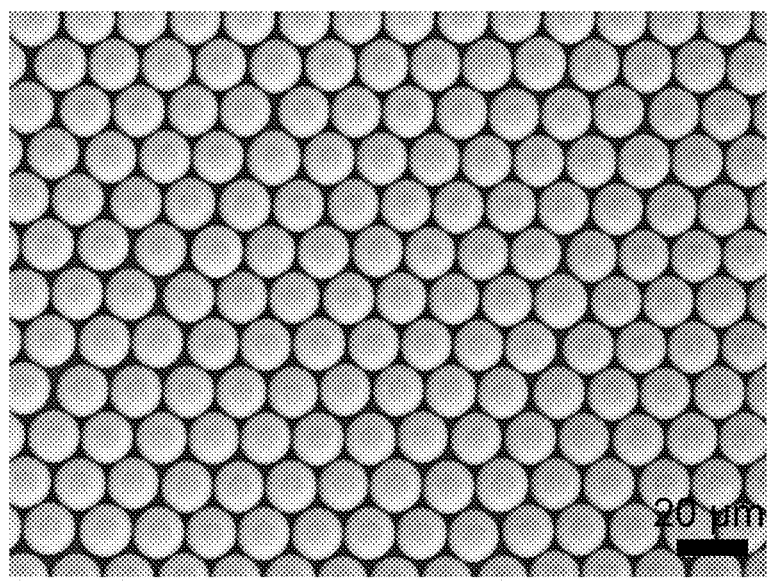
FIG. 3 is a surface image of the PS retroreflective film observed with SEM.
Figure 4:
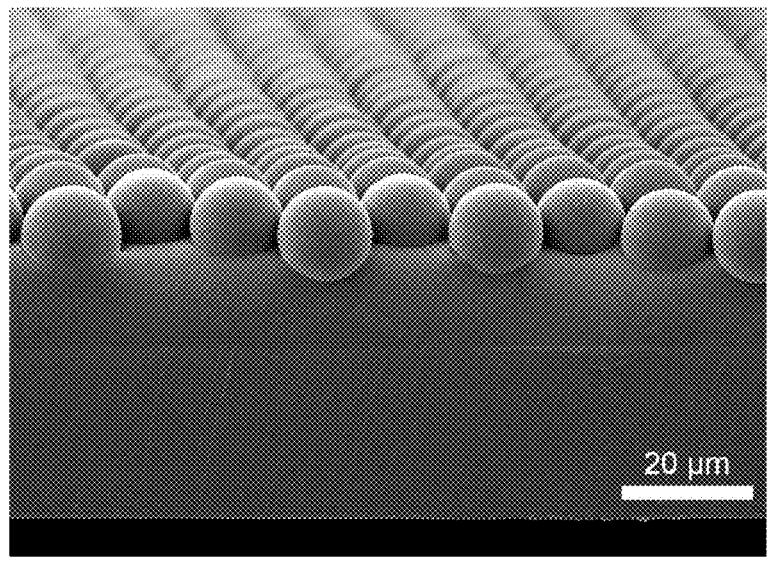
FIG. 4 is a cross-sectional SEM image of the PS retroreflective film.

FIG. 3 is a surface image of the PS retroreflective film observed with SEM. It can be seen that the 15 μm PS microspheres are regularly and tightly arranged on the adhesive layer of the transparent film. FIG. 4 is a cross-sectional SEM image of the PS retroreflective film. It can be seen that the transparent film includes a backing layer and an adhesive layer, and the 15 µm PS microspheres were partially embedded into the adhesive layer.

Figure 5:
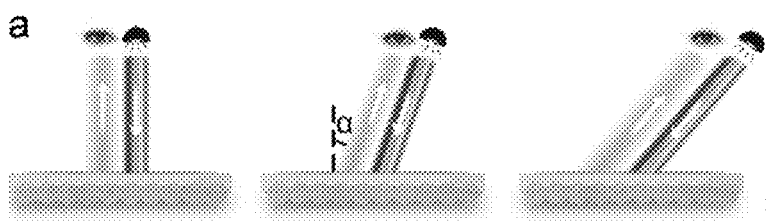
FIG. 5 is a drawing showing that the reflection colour of retroreflective structural colour film is constant when the illumination axis and the viewing axis are parallel to each other, and at different illumination/viewing angle of α.
Figure 6:
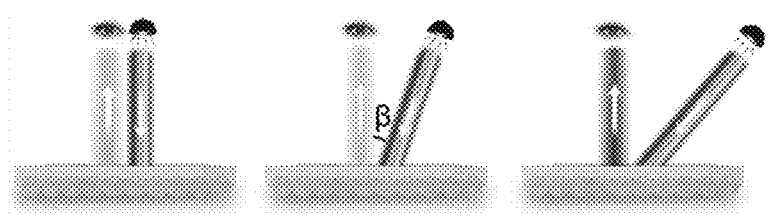
FIG. 6 is a drawing showing that the reflection colour of retroreflective structural colour film changes when the viewing axis is perpendicular to the film surface and the illumination angle β changes.
Figure 7:
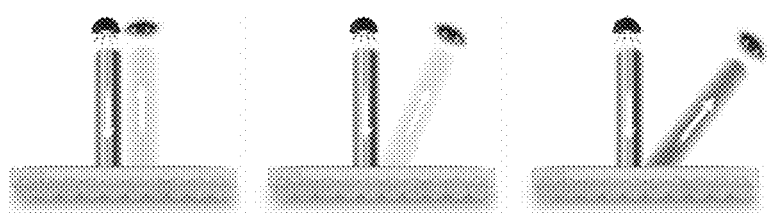
FIG. 7 is a drawing showing that the reflection colour of retroreflective structural colour film changes when the illumination axis is perpendicular to the film surface and the viewing angle changes.

FIG. 5, FIG. 6 and FIG. 7 are drawings for illustrating non-iridescent colour under parallel illumination and viewing condition, and iridescent colour under non-parallel illumination and viewing condition of the PS retroreflective film. Non-iridescent colour under parallel illumination and viewing condition means that when the illumination axis and the viewing axis are parallel and the illumination/viewing angle α changes together along the normal line of the film, the observed reflection colour does not change, as shown in FIG. 5.

Iridescent colour under non-parallel illumination and viewing condition means that when the illumination axis and the viewing axis are non-parallel, the angle change between the illumination axis and the viewing axis could cause a change in the reflection colour of the film, which can be divided into two situations: (1) When the viewing axis is fixed (such as perpendicular to the surface of the retroreflective film) while the angle β between the illumination axis and the viewing axis changes, the observed reflection colour of the film would change, as shown in FIG. 6; (2) When the illumination axis is fixed (such as perpendicular to the surface of the retroreflective film) while the angle between the illumination axis and the viewing axis changes, the observed reflection colour of the film would change, as shown in FIG. 7.

Figure 8:
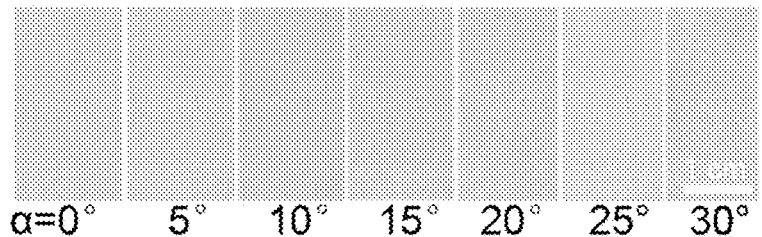
FIG. 8 is a group of parallel illumination/viewing photographs of the PS retroreflective film of the present embodiment taken by a camera equipped with a white LED ring flash, at different illumination/viewing angle of α.

FIG. 8 is a group of parallel illumination/viewing photographs of the PS retroreflective film of the present embodiment taken by a camera equipped with a white LED ring flash, at different illumination/viewing angle of α. When the illumination/viewing angle α is varied at 0°, 5°, 10°, 15°, 20°, 25° and 30°, the film always appears bluish-green, while the brightness of the reflection decreases gradually.

In order to validate the constant colour under parallel illumination and viewing condition, the reflectance spectrum of the PS retroreflective film of the present embodiment is measured with an angle-resolved spectrometer. When measuring, the illumination axis and the detection axis of the spectrometer are parallel, and the illumination/detection angle α changes from 0° to 30° at 1° interval).

Figure 9:
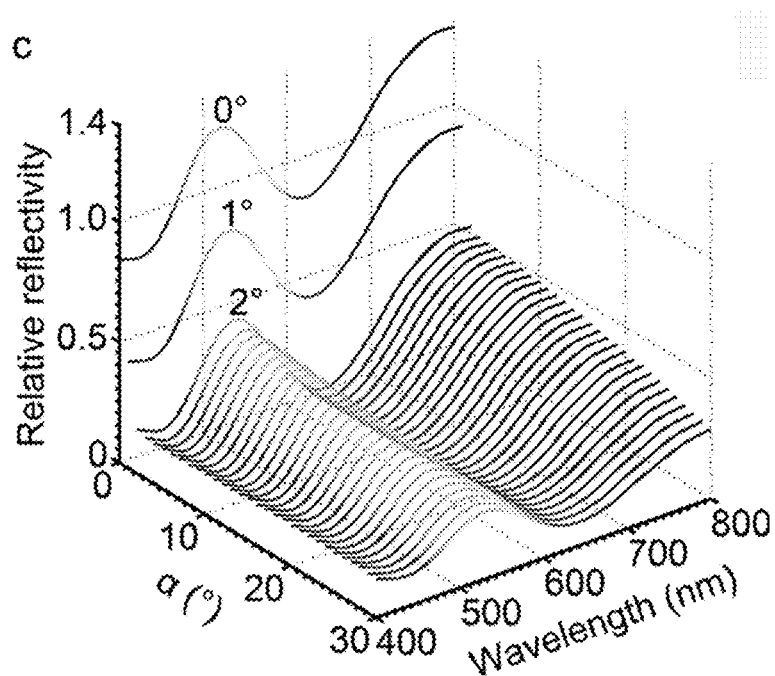
FIG. 9 is the angle-resolved reflectance spectra of the PS retroreflective film under parallel illumination and detection condition and at different illumination/detection angle of α.

FIG. 9 is the angle-resolved reflectance spectra of the PS retroreflective film under parallel illumination and detection condition and at different illumination/detection angle of α.

As shown in FIG. 9, when angle α changes, the wavelength position of the reflection peak of the film at 520 nm does not change, which is a good proof of the constant colour of the film under parallel illumination and viewing condition. Meanwhile, it could be also observed that when α changes from 00 to 20, the reflectance of the film at 520 nm decreases remarkably, and when α continues to increase, the reflectance of the film at 520 nm decreases slowly. It is in good accordance with the result of the change in the reflected brightness shown in above FIG. 8.

Figure 10:
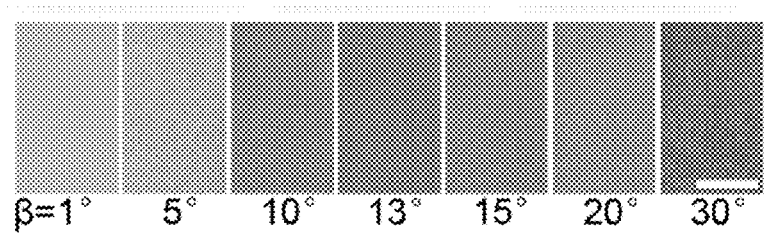
FIG. 10 is a group of non-parallel illumination/viewing photographs of the PS retroreflective film of the present embodiment taken normal to the sample surfaces by a camera and at an oblique illumination angle of β by using a white LED flashlight.

FIG. 10 is a group of non-parallel illumination/viewing photographs of the PS retroreflective film of the present embodiment taken normal to the sample surfaces by a camera and at an oblique illumination angle of β by using a white LED flashlight.

As shown in FIG. 10, when the viewing axis is perpendicular to the film surface, and the angle β of the illumination axis changes gradually, the film appears different colours. That is, the film is green when β=1°, light green when β=5°, purple when β=10°, fuchsia when β=13°, light fuchsia when β=15°, very pale green when β=20°, and almost no colour when β=30°.

In order to validate the colour change under non-parallel illumination and viewing condition, the reflectance spectrum of the PS retroreflective film of the present embodiment is measured with an angle-resolved spectrometer. When measuring, the detection axis is perpendicular to the film, and the angle β between the illumination axis and the film normal line changes gradually from 0° to 30° at 1° interval.

Figure 11:
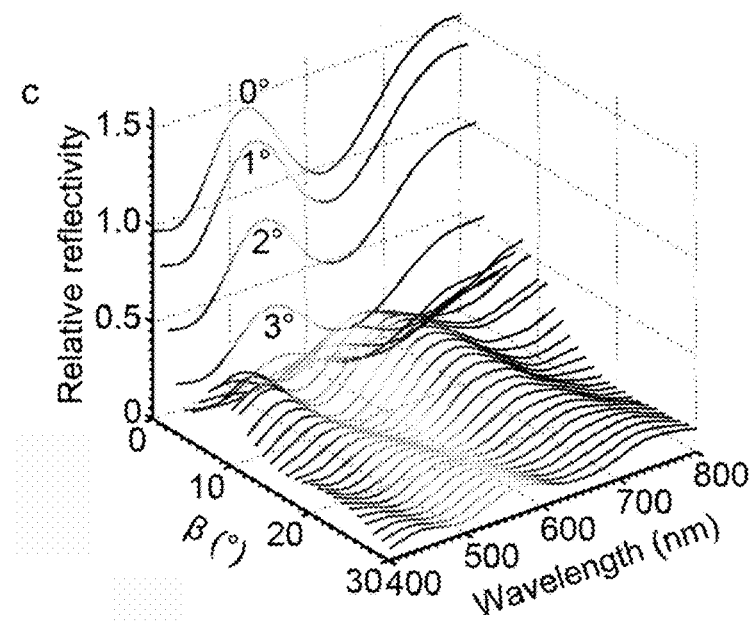
FIG. 11 is the angle-resolved reflectance spectra of the PS retroreflective film at an oblique illumination angle of β and at a fixed detection angle of 0°.

FIG. 11 is the angle-resolved reflectance spectra of the PS retroreflective film at an oblique illumination angle of β and at a fixed detection angle of 0°.

As shown in FIG. 11, the reflection peak changes continuously as the angle β changes, which is in good accordance with the result of the change in the reflection colour shown in FIG. 10.

Figure 12:
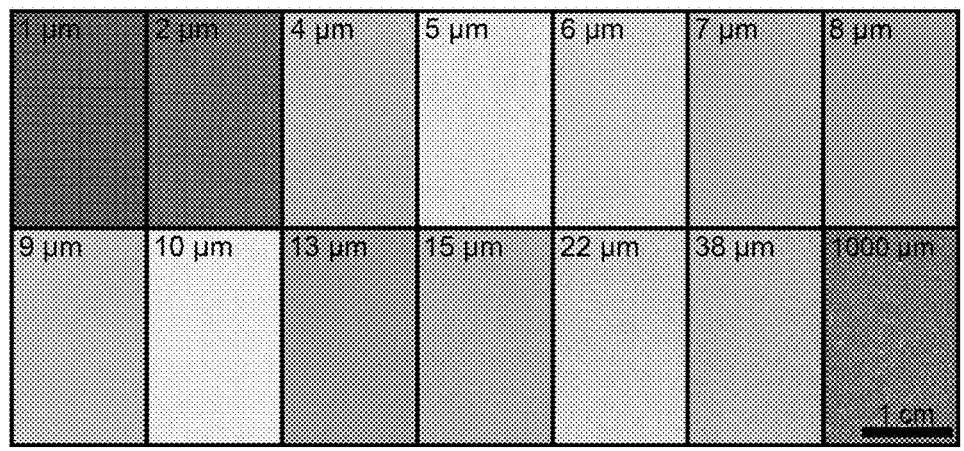
FIG. 12 is a group of photographs of the retroreflective films assembled with PS microspheres of 1 μm, 2 μm, 4 μm, 5 μm, 6 μm, 7 μm, 8 μm, 9 μm, 10 μm, 13 μm, 15 μm, 22 μm, 38 μm and 1000 μm under the condition of normal illumination and viewing by using a camera equipped with a white LED ring flash.

FIG. 12 is a group of photographs of the retroreflective films assembled with PS microspheres of 1 µm, 2 µm, 4 µm, 5 µm, 6 µm, 7 µm, 8 µm, 9 µm, 10 µm, 13 µm, 15 µm, 22 µm, 38 µm and 1000 µm under the condition of normal illumination and viewing by using a camera equipped with a white LED ring flash.

As shown in FIG. 12, the retroreflective films prepared with PS microspheres of different particle diameters have different reflection colours.

Furthermore, the inventors of the present invention have prepared a traffic sign made of the above-mentioned retroreflective film, and present an example of a night driving scene to demonstrate the performance of the traffic sign when illuminated by the headlights of a moving vehicle at night.

Figure 13:
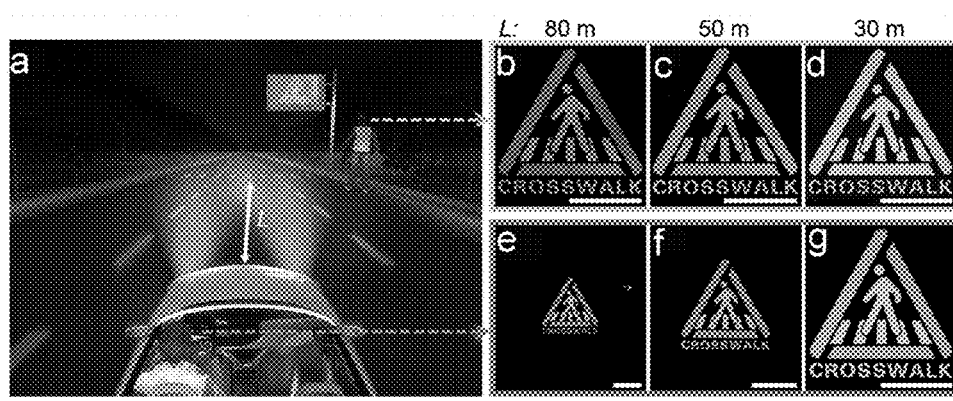
FIG. 13 is a simulation night driving scene and the corresponding photographs of a driver's view or a pedestrian's view of a traffic sign made of the retroreflective film.

FIG. 13 is a simulation night driving scene and corresponding photographs of a driver's view or a pedestrian's view of the traffic sign made of the retroreflective film of the present embodiment. Wherein FIG. 13 (a) is an illustration diagram of the simulated scene, FIG. 13 (b), FIG. 13 (c), FIG. 13 (d) are photographs of the traffic sign seen by the pedestrian when the distance L between the vehicle and the sign is 80 m, 50 m and 30 m respectively, and FIG. 13(e), FIG. 13 (f), FIG. 13 (g) are photographs of the traffic sign seen by the driver when the distance L is 80 m, 50 m, and 30 m respectively.

As shown in FIG. 13(a), the simulation scene is: the traffic sign made of the retroreflective film is located on the roadside and illuminated by the headlights of a moving vehicle, and the pedestrian stands at the roadside without moving while the vehicle is driving toward the traffic sign. Since the vehicle is moving toward the traffic sign, the distance L between the vehicle and the traffic sign reduces gradually.

As shown in FIG. 13(e)-13(g), as the vehicle gradually approaches the traffic sign, the colour of the traffic sign seen by the driver in the vehicle does not change. The reason is that the driver's eyes and the headlights are oriented at approximately the same angle to the traffic sign (i.e., parallel illumination and viewing condition).

In contrast, as shown in FIG. 13(b) to FIG. 13(d), the pedestrian can see a nearly constant colour when the distance L is 80 m and 50 m, but see a changing colour when the distance L is 30 m. The reason is that the angle between the pedestrian's line of sight and the headlight axis to the traffic sign varies as the position of the moving vehicle. This angle increases slowly when the vehicle is far from the sign, but rapidly as the vehicle is close to the sign. This colour change can function as a smart visual indicator for warning the approaching vehicles, especially when the pedestrian is hearing-impaired or wearing headsets.

This unique non-iridescent colour (to drivers) and iridescent colour (to pedestrians, cyclists and other vulnerable road users) can also be implemented to develop other traffic safety devices, for example, cylindrical reflective delineators.

Figure 14:
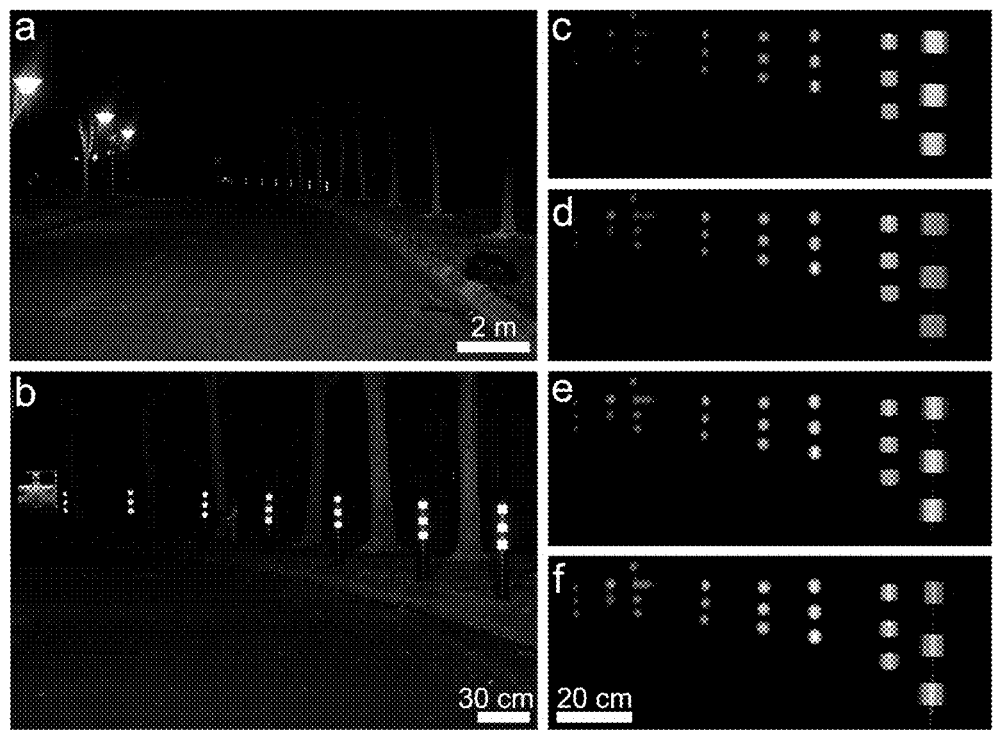
FIG. 14 is a group of photographs showing a driver's view or a pedestrian's view of cylindrical reflective delineators made of the retroreflective film.

FIG. 14 is a group of photographs of a driver's view or a pedestrian's view of the cylindrical reflective delineators made of the retroreflective film of the present embodiment. Wherein FIG. 14 (a), FIG. 14 (b) are photographs of the driver's view when a vehicle approaches the delineators from far to near, demonstrating a constant colour from each delineator. FIG. 14 (c), FIG. 14(d), FIG. 14 (e), FIG. 14 (f) are photographs of the pedestrian's view when the vehicle approaches the delineators from far to near, demonstrating dynamically changing colours.

Furthermore, the inventors of the present invention have prepared a billboard with a "Fudan University" logo made of the above-mentioned retroreflective film, and present a night driving scene to demonstrate the advertising application of the billboard seen by a pedestrian when the billboard is illuminated by the headlights of a passing vehicle at night.

Figure 15:
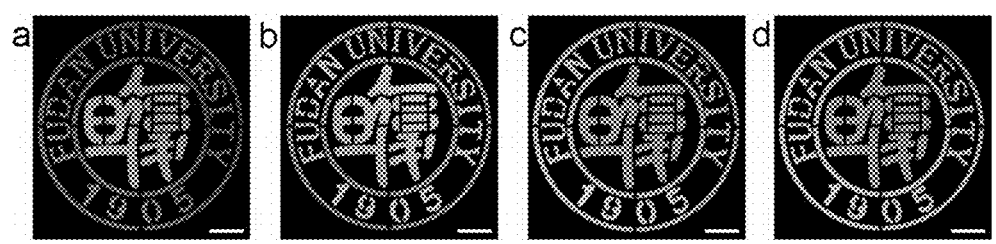
FIG. 15 is a group of photographs showing a pedestrian's view of a billboard made of the retroreflective film.

FIG. 15 is a group of photographs of a pedestrian's view of the billboard made of the retroreflective film of the present embodiment. Wherein FIG. 15 (a), FIG. 15 (b), FIG. 15 (c) and FIG. 15 (d) are the photographs of the billboard seen by the pedestrian when the distance L between the vehicle and the billboard is 80 m, 40 m, 15 m and 10 m respectively.

As shown in FIG. 15, the colour of the billboard seen by the pedestrian changes as the vehicle approaches, in which the change procedure is green (80 m)→light green (40 m)→fuchsia (15 m)→purple (10 m). Thus, the retroreflective film can serve as an energy-saving billboard for pedestrians by utilizing the light energy of passing vehicles.

In accident-prone areas, active lighting and traffic signals are required to deliver warning information to drivers and pedestrians. Flickering and colour-changing signals, which usually require advanced control circuits, are widely used for this purpose. Here, the inventors of the present invention demonstrate a smart flickering traffic sign using the retroreflective film with no need for active control circuits.

Figure 16:
FIG. 16 is a simulation night driving scene and the corresponding photographs of a driver's view of a flickering traffic sign made of the retroreflective film.

FIG. 16 is a simulation night driving scene and corresponding photographs of a driver's view of the flickering traffic sign made of the retroreflective film of the present embodiment. Wherein FIG. 16 (a) is an illustration diagram of the simulated scene, in which a white light LED lamp is fixed next to the sign as the light source, and a vehicle is passing the sign from right to left. FIG. 16 (b), FIG. 16 (c), FIG. 16 (d), FIG. 16 (e), FIG. 16 (f) are photographs of the traffic sign seen by the driver from the side window of the moving vehicle, showing a flickering and colour-changing effect. Because the flickering frequency is proportional to the observer's speed, this passive flickering image can serve as an interactive warning signal to road users to enhance their awareness of speed limits or other road hazards.

The retroreflective film can also be used in anti-counterfeiting applications. The inventors have prepared a banknote anti-counterfeiting mark by using the PS retroreflective films of different particle diameters.

Figure 17:
FIG. 17 is a group of photographs of the banknote anti-counterfeiting mark made of the retroreflective film.

FIG. 17 is a group of photographs of the banknote anti-counterfeiting mark made of the retroreflective films. Wherein FIG. 17 (a) is a photograph under the condition that the flash is not turned on, FIG. 17 (b) is a photograph of an angle taken under the condition that the flash is turned on, and FIG. 17 (c) is a photograph of another angle under the condition that the flash is turned on.

In the banknote anti-counterfeiting mark shown in FIG. 17, "CNY" is made of the PS retroreflective film assembled with 15 μm PS microspheres, and "100" is made of the PS retroreflective film assembled with 13 μm PS microspheres.

As shown in FIG. 17, under the condition that the flash is not turned on, almost no pattern can be seen in the above-mentioned anti-counterfeit mark; under the condition that the flash is turned on, different colours shows on photographing from different angles (equivalent to observation from different angles). Therefore, when the PS retroreflective film of the present invention is used in anti-counterfeit marks, it can be distinguished from the mark of prior art by a unique colour-changing and retroreflection effect, and has a better anti-counterfeiting effect.

The retroreflective film can also be fabricated from microspheres of other materials, for example $SiO_2$ microspheres.

Figure 18:
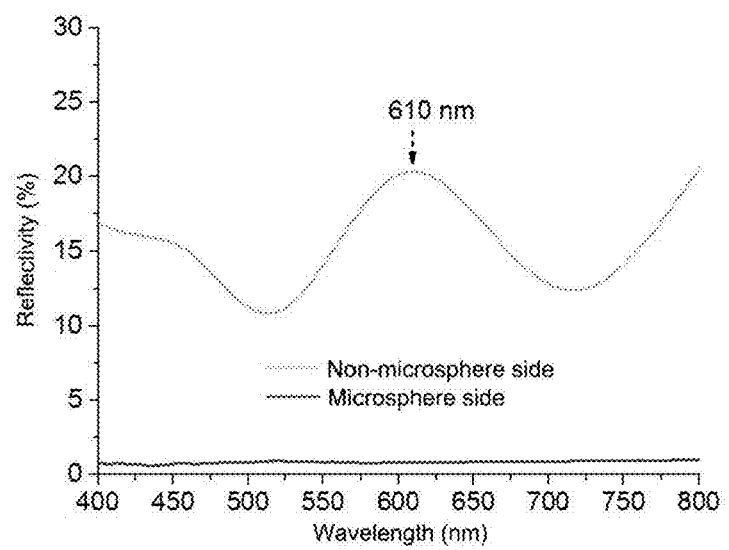
FIG. 18 is the reflectance spectra measured from the tape side or microsphere side of a retroreflective film prepared with 15 μm $SiO_2$ microspheres using the above-mentioned preparation method.

FIG. 18 is the reflectance spectra measured from the tape side or microsphere side of a retroreflective film prepared with 15 μm $SiO_2$ using the above-mentioned preparation method.

As shown in FIG. 18, the film surface without microspheres has a strong reflection peak at 610 nm, and the film surface with microspheres is hardly reflective in the visible region. Therefore the retroreflective film prepared with 15 μm $SiO_2$ also has similar retroreflective properties as the PS retroreflective film.

In the above embodiment, the retroreflective film is assembled by using the rubbing assembly method to obtain the monolayer of microspheres. However, in the present invention other assembly methods can also be used, such as liquid volatilization assembly method, interface assembly method, template assembly method, mechanical spraying method or spin coating method. The monolayer of microspheres can be assembled by any one of these methods, and then can be transferred to the adhesive layer of the scotch tape.

Wherein the liquid volatilization assembly method is to add water or ethanol dispersion droplets of the microspheres onto the glass or silicon substrate, and to dry at room temperature. The monolayer of microspheres will be assembled on the substrate by the capillary force between the microspheres produced by liquid volatilization.

The interface assembly method is to slowly drop the ethanol dispersion of the microspheres onto the water surface so as to spread the microspheres on the water surface into a monolayer array by the interfacial tension. Then the monolayer of microspheres can be prepared by picking up the monolayer from the water surface with a glass or silicon substrate.

The template assembly method is to process a groove with characteristic pattern on a plastic or metal substrate, and then add water or ethanol dispersion droplets of the microspheres into the groove. After the liquid is evaporated and dried, a monolayer of microspheres with the characteristic pattern will be formed in the groove.

The mechanical spraying method is to disperse the microspheres into a mixture of water and ethanol, and add the microsphere dispersion to the spray gun. Then apply an external force to press the nozzle to make a spray, receive the spray with a glass or silicon substrate and dry the substrate at room temperature to prepare the microsphere array.

In addition, in the above embodiments, the material of the microspheres is PS or silica with different particle diameters, and both of the materials can perform colour-changeable effect and good retroreflective properties. However, the inventors have found that other microspheres of various materials can also perform similar colour-changeable effect and retroreflective properties, such as polystyrene, polymethyl methacrylate, polyacrylic acid, polyvehiclebonate, polyurethane, epoxy resin, silica, titanium dioxide, borosilicate, barium titanate and aluminum oxide. Meanwhile, the retroreflective property and colour-changing property of the retroreflective structural colour film formed by different materials and different particle diameters are also different, so the material and particle diameter can be selected according to actual needs. Further, according to different needs, microspheres of different materials and different particle diameters may be put on different regions of the same film to form colour-changing property of the retroreflective structural colour film with some specific pattern, or different colour-changing property of the retroreflective structural colour film s may be pasted together on one item such as traffic sign to form the specific pattern.

What is claimed is:

1. A preparation method of retroreflective structural colour film, characterized in that specific steps are:
   (1) assembling colloidal microspheres to form a monolayer of microspheres on a surface of a substrate material by a self-assembly method, wherein a material of said colloidal microspheres is any one or any combination of following organic or inorganic components: polystyrene, polymethyl methacrylate, polyacrylic acid, polycarbonate, polyurethane, epoxy resin, silica, titanium dioxide, borosilicate, barium titanate and aluminum oxide; and
   (2) transferring said monolayer of microspheres prepared in the step (1) onto a transparent substrate having an adhesive layer to make said monolayer of microspheres immersed in said adhesive layer to prepare said retroreflective structural colour film.

2. The preparation method according to claim 1, wherein a particle diameter of said colloidal microspheres is in a range of 1 μm to 1000 μm.

3. The preparation method according to claim 1, wherein said colloidal microspheres are microspheres with a uniform particle diameter or a mixture of microspheres with two or more particle diameters.

4. The preparation method according to claim 1, wherein the method for assembling said colloidal microspheres to form said monolayer of microspheres is any one of rubbing assembly method, liquid volatilization assembly method, interface assembly method, template assembly method, mechanical spraying method and spin coating method.

5. The preparation method according to claim 1, wherein said adhesive layer is a scotch tape.

6. The preparation method according to claim 1, wherein said transparent substrate is coated with the adhesive layer or coated with a viscous layer.

7. The preparation method according to claim 1, wherein said monolayer of microspheres being immersed in said adhesive layer means that said monolayer of microspheres is at least partially embedded into said adhesive layer.

* * * * *